(12) United States Patent
Zhang et al.

(10) Patent No.: US 8,081,576 B2
(45) Date of Patent: Dec. 20, 2011

(54) MULTIPATH SEARCHER RESULTS SORTING METHOD

(75) Inventors: Benyuan Zhang, Drexel Hill, PA (US); Paul Gothard Knutson, Lawrenceville, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 774 days.

(21) Appl. No.: 11/922,644

(22) PCT Filed: Jun. 24, 2005

(86) PCT No.: PCT/US2005/022366
§ 371 (c)(1),
(2), (4) Date: Dec. 20, 2007

(87) PCT Pub. No.: WO2007/001288
PCT Pub. Date: Jan. 4, 2007

(65) Prior Publication Data
US 2010/0220603 A1    Sep. 2, 2010

(51) Int. Cl.
*H04L 12/26* (2006.01)
*H04B 7/216* (2006.01)
*H04B 15/00* (2006.01)

(52) U.S. Cl. ........ 370/252; 370/342; 455/501; 455/513; 455/63.1

(58) Field of Classification Search .................. 370/252, 370/310, 335, 342, 441; 455/501, 504, 506, 455/513, 59, 63.1, 67.13
See application file for complete search history.

(56) References Cited

U.S. PATENT DOCUMENTS

| 5,440,597 A | 8/1995 | Chung et al. |
| 5,642,377 A * | 6/1997 | Chung et al. .................. 375/145 |
| 6,731,622 B1 * | 5/2004 | Frank et al. .................... 370/342 |
| 7,764,726 B2 * | 7/2010 | Simic et al. .................... 375/150 |
| 2004/0229637 A1 * | 11/2004 | Wang et al. ................... 455/506 |

FOREIGN PATENT DOCUMENTS

| EP | 0756387 | 1/1997 |
| EP | 1411738 A1 | 4/2004 |
| JP | 11266183 | 9/1999 |
| JP | 2001211099 | 8/2001 |
| JP | 2002223179 | 8/2002 |
| JP | 2002319877 | 10/2002 |
| JP | 2004104225 | 4/2004 |

OTHER PUBLICATIONS

International Search Report, dated Mar. 6, 2006.

* cited by examiner

*Primary Examiner* — Aung S Moe
*Assistant Examiner* — Kerri Rose
(74) *Attorney, Agent, or Firm* — Robert D. Shedd; Joseph J. Opalach; Catherine A. Cooper

(57) ABSTRACT

A method and apparatus for identifying valid multipath energy peaks are described including locating an energy peak in a profile of energy peaks, categorizing the located energy peak based on a plurality of thresholds and processing energy peaks in at least one of the categories of located energy peaks. The method and apparatus further includes removing a direct current value component from each value in the profile of energy peaks, calculating a noise floor for a multipath searching window and determining a first threshold and a second threshold. The step and means for categorizing further includes determining if the located energy peak exceeds the first threshold, labeling the located energy peak as a false alarm, if the located energy peak does not exceed the first threshold, determining if the located energy peak exceeds the second threshold and labeling the located energy peak as confident, if the located energy peak exceeds the second threshold.

20 Claims, 2 Drawing Sheets

MULTIPATH SEARCHER RESULTS SORTING METHOD

This application claims the benefit, under 35 U.S.C. §365 of International Application PCT/US2005/022366 filed Jun. 24, 2005, which was published in accordance with PCT Article 21(2) on Jan. 4, 2007.

FIELD OF INVENTION

The present invention relates in general to wireless communications and specifically to a method and apparatus for sorting the results of a multipath search.

BACKGROUND OF THE INVENTION

The general problem addressed by this invention is how to identify the different multipath components in a received WCDMA signal. This function is typically handled by a block in the receiver called the Multipath Searcher.

The characteristics of a dynamic fading channel are that it will degrade the performance of a multipath searcher using long coherent integration times. Another problem resulting from the characteristics of quickly changing fading channels is that the results from the early portion of the search cannot be meaningfully compared to the results from the later portion of the search because the channel has changed significantly in the intervening time.

The conventional approach employs a bank of correlators in the searcher and then runs the searcher over the certain code space (searching window). In order to locate all possible paths, it is necessary to consider the worst case. The longer the searcher window is, the larger the bank of correlators. The control logic is very simple for this approach, but more hardware resources are needed.

Usually there are two stages in a multipath searcher. The first stage is to get the multipath profile as described above. That is, the first stage locates all of the energy peaks and stores the energy peaks in a profile. The second stage is to identify valid energy peaks from an available profile. Due to a harsh wireless environment, false energy peaks exist in the multipath searcher profile. These may cause the multipath searcher to find paths, which do not actually describe the received multipath, creating a "false alarm" result for the multipath searcher. The general problem addressed by the present invention is how to sort the multipath profile reliably and efficiently. It would be advantageous to reduce the possibility of "false alarms" and improve the receiver's performance.

SUMMARY OF THE INVENTION

The present invention is a method for identifying the valid energy peaks from a multipath searching profile. This method will reliably identify the true paths and reduce the possibility of false alarm to improve the receiver's performance. A method to reliably and efficiently identify the valid multipaths based on the searcher profile is described.

Specifically, a method and apparatus for identifying valid multipath energy peaks are described including locating an energy peak in a profile of energy peaks, categorizing the located energy peak based on a plurality of thresholds and processing energy peaks in at least one of the categories of located energy peaks. The method and apparatus further includes removing a direct current value component from each value in the profile of energy peaks, calculating a noise floor for a multipath searching window and determining a first threshold and a second threshold of the plurality of thresholds. The step and means for categorizing further includes determining if the located energy peak exceeds the first threshold of the plurality of thresholds, labeling the located energy peak as a false alarm, if the located energy peak does not exceed the first threshold of the plurality of thresholds, determining if the located energy peak exceeds the second threshold of the plurality of thresholds and labeling the located energy peak as confident, if the located energy peak exceeds the second threshold of the plurality of thresholds. The step and means for processing further include adjusting values of neighbor peaks of the located energy peak.

An apparatus for identifying valid multipath energy peaks is described including a memory for receiving and storing multipath energy peaks, a search arithmetic/logic unit for sorting the multipath energy peaks and a control state machine for controlling the sorting operation, wherein the multipath sorting operation includes the following acts removing a direct current value component from each value in a profile of energy peaks, calculating a noise floor for a multipath searching window, determining a confidence threshold and a minimum threshold, locating an energy peak in the profile of energy peaks, determining if the located energy peak exceeds the minimum threshold, marking the located energy peak as a false alarm, if the located energy peak does not exceed the minimum threshold, determining if the located energy peak exceeds the confidence threshold, marking the located energy peak as confident, if the located energy peak exceeds the confidence threshold and adjusting all values of neighbor peaks of the located energy peak.

BRIEF DESCRIPTION OF THE DRAWINGS

The present invention is best understood from the following detailed description when read in conjunction with the accompanying drawings. The drawings include the following figures briefly described below where like-numbers on the figures represent similar elements.

DETAILED DESCRIPTION OF THE PREFERRED EMBODIMENTS

Figure 1:
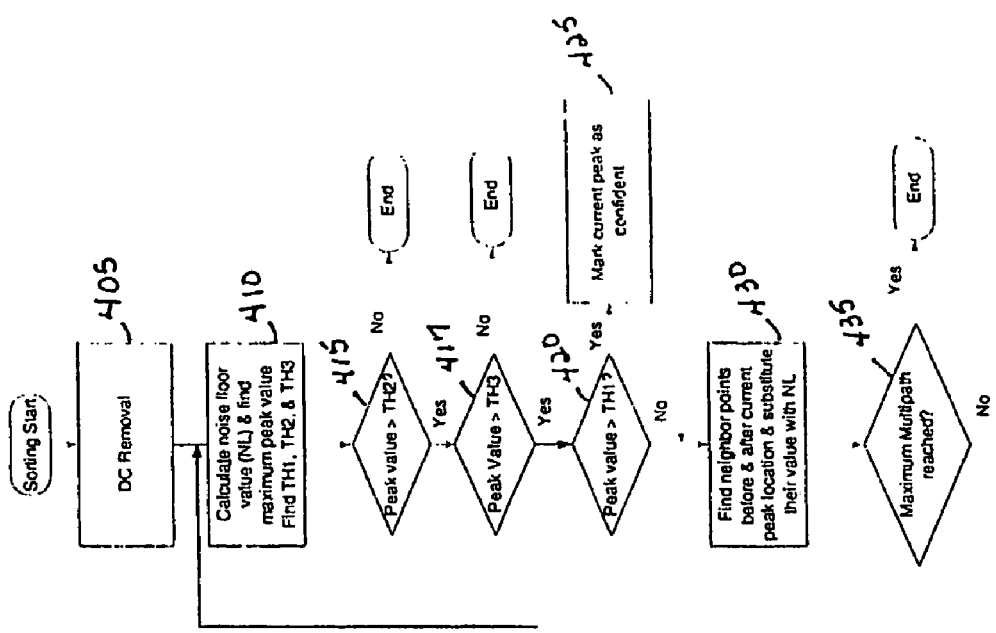
FIG. 1 is a flowchart of the present invention.

Normally the multipath searcher will store the profile of the located energy peaks in memory. When the multipath searcher profile procedure is finished, the multipath sorting procedure will be executed to provide multipath searcher results. Due to the harsh wireless environment, the profile values may be very noisy. In our algorithm, this noise will be considered and used to improve the multipath searcher performance.

First, the lowest value in the searching window (all correlation values are positive, due to the non-coherent correlation) is found and removed from each entry in the search buffer. This process is called DC value removal. V is the buffer of correlation values output from the searcher, $V_i$ is an individual entry in the buffer, where i ranges from 0 to M−1.

$$V_i = V_i - \mathrm{MIN}(V) \quad i=0 \ldots M-1$$

Second, the noise floor is calculated for the entire multipath searching window. Assuming that the total searching window has M points, where M is the number of samples per chip times the number of chips in the search window (typically 256 chips), the noise floor NL is:

$$NL = \frac{\sum_{i=0}^{M} V_i}{M} \quad (1)$$

$V_i$ is an individual value for each point where i=0 . . . M−1. The worst case situation occurs during handover/handoff, which is typically 256 chips.

Based on the computed noise floor value, there are two thresholds TH1 and TH2 for multipath searcher peak identification.

$$TH1 = T1 * NL \quad (2)$$

$$TH2 = T2 * NL \quad (3)$$

where, T1 and T2 are constants.

TH1 usually is larger than TH2. TH1 is called a confidence threshold and TH2 is called a minimum threshold. The confidence threshold and the minimum threshold are adaptively determined based on the noise floor. The constants T1 and T2 have been determined experimentally using simulation and example channels. T1 has been determined to be 8, T2 is 4 when searching for the first peak, and is adapted to 2.95 for subsequent iterations of the process/loop. Any profile value that is larger than TH1 is a confident valid multipath. The receiver can assign a Rake Finger for it immediately without the finger validation stage or the searching validation stage. Any profile value that is larger than TH2 but smaller than TH1 is a potential multipath. The receiver needs to validate it through either the Rake Finger or through the multipath searcher. Any profile value that is larger than TH1 is confidently marked as a valid multipath. A third threshold, referred to as the contribution threshold, is based on the largest peak found, P0. This threshold is used to determine whether subsequent peaks will contribute significantly to the received signal. This third threshold is computed as follows:

$$TH3 = T3 * P0 \quad (4)$$

where T3 has been determined experimentally to be 0.17. The first peak that is found, is not affected by this threshold. Subsequent peaks could be eliminated if the first peak is large. On the first pass, TH3 is zero since no first peak has been found.

Third, a peak from current profile is located. The peak value and its index in the profile are stored. If the peak value is greater than TH2, it is a potential valid multipath. Otherwise, sorting stops here.

Fourth, if the peak exists, all values of the neighbor points of the peak need to be adjusted. This is due to the energy peaks behaving like a sine function. The channel impulse response is similar to a sine function shape due to the pulse-shaping filter at the receiver front end. A walking-through method is used to find any point before and after this local peak value.

Fifth, the neighbor peaks of the valid peak need to have the noise floor value substituted for their current values. The above steps are repeated until all peak values and their indexes have been found.

Specifically, referring to FIG. 1, DC value is removed at 405. This entails locating the lowest value in the search window and subtracting it from each value in the search buffer. At 410 the noise floor is calculated and the confidence threshold and the minimum threshold are determined as well as finding the maximum energy peak value. Next, at 415, the maximum energy peak value is compared to the minimum threshold and a determination is made if the maximum energy peak value exceeds the minimum threshold. If the maximum peak value does not exceed the minimum threshold then the process stops. Next, at 417, the maximum energy peak value is compared to the contribution threshold and a determination is made if the maximum energy peak value exceeds the contribution threshold. If this is the first peak, this threshold is zero. If the maximum peak value does not exceed the contribution threshold, then the process stops. If the maximum energy peak value exceeds the contribution threshold then, at 420, a comparison is made between the located maximum energy peak value and the confidence threshold and a determination is made if the located maximum energy peak value exceeds the confidence threshold. If the maximum energy peak value exceeds the confidence threshold then the current peak is confidently marked as a valid multipath at 425. If the maximum energy peak value does not exceed the confidence threshold then the current energy peak may be a valid multipath. At 430, the neighbor points/peaks of the current energy peak are located and their values are replaced with the computed noise floor. At 435, a determination is made if all of the maximum energy peak values have been located. If all maximum energy peak values have been located then the process stops. If all maximum energy peak values have not been located then steps 410 through 430 are executed repeatedly until all maximum energy peak values have been located.

Figure 2:
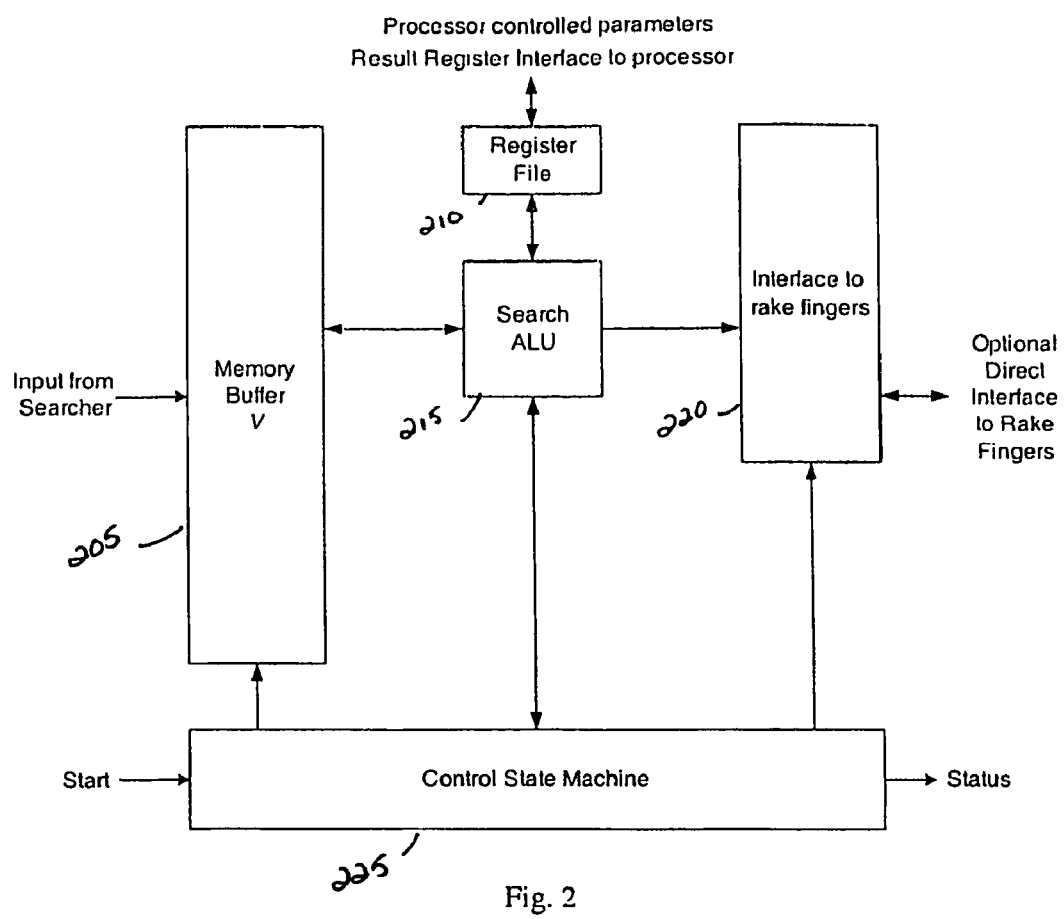
FIG. 2 is a block diagram of the present invention.

While it is likely that this invention will be implemented as software on an embedded processor as a part of an ASIC, it is possible to implement the function as a state machine controlled data path. An arithmetic logic unit (ALU) will perform the mathematical operations, while a state machine will control access to the different memories or registers. FIG. 2 illustrates the searcher buffer (containing V) being accessed by a state machine and an associated ALU. The results of the search operation are made available to the system processor, and are optionally be used to directly control the finger assignment in the rake receiver. The system processor initiates the state machine when the search results were available, and the state machine would provide status indicating that the search operation is complete. This includes an interrupt so as to not require the system processor to poll status registers.

Specifically, referring to FIG. 2, memory buffer V 205 receives the profile of the located energy peaks from a multipath searcher. Control state machine 225 controls the memory buffer V 205, the search ALU 215 and the interface to the rake fingers 220. Control state machine 225 is initiated by a system processor (not shown) when the profile of the located energy peaks are available in memory buffer V 205. Register file 210 receives processor-controlled parameters and outputs the results of the multipath searcher and the present associated sorting method and apparatus to the system processor (not shown). Search ALU 215 performs the mathematical operations described above on the energy peaks stored in memory buffer V 205. The results of the sorting operation are optionally used by search ALU 215 to control the interface to the rake fingers of the receiver. Memory buffer V 205 receives and stores multipath energy peaks. Search arithmetic/logic unit 215 sorts/categorizes the multipath energy peaks and control state machine 225 controls the sorting/categorizing operation. The multipath sorting/categorizing operation includes the removing a direct current value component from each value in a profile of energy peaks, calculating a noise floor for a multipath searching window, determining a confidence threshold and a minimum threshold, locating an energy peak in the profile of energy peaks, determining if the located energy peak exceeds the minimum threshold, marking the located energy peak as a false alarm, if the located energy peak does not exceed the minimum threshold, determining if the located energy peak exceeds the confidence threshold, marking the located energy peak as confident, if the located energy peak exceeds the confidence threshold and adjusting all values of neighbor peaks of the located energy peak.

It is to be understood that the present invention may be implemented in various forms of hardware, software, firmware, special purpose processors, or a combination thereof, for example, within a mobile terminal, access point, or a cellular network. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for identifying valid multipath energy peaks, said method comprising:
   removing a direct current value component from each value in a profile of energy peaks;
   locating an energy peak in said profile of energy peaks;
   categorizing said located energy peak based on a plurality of thresholds; and
   processing energy peaks in at least one of said categories of located energy peaks, wherein said processing act further comprises adjusting values of neighbor peaks of said located energy peak, wherein said adjusting operation further comprises substituting said noise floor for said neighbor peaks of said located energy peak.

2. The method according to claim 1, further comprising:
   calculating a noise floor for a multipath searching window; and
   determining a first threshold and a second threshold of said plurality of thresholds.

3. The method according to claim 2, wherein said categorizing act further comprises:
   determining if said located energy peak exceeds said first threshold of said plurality of thresholds;
   labeling said located energy peak as a false alarm, if said located energy peak does not exceed said first threshold of said plurality of thresholds;
   determining if said located energy peak exceeds said second threshold of said plurality of thresholds; and
   labeling said located energy peak as confident, if said located energy peak exceeds said second threshold of said plurality of thresholds.

4. The method according to claim 3, further comprising:
   calculating a third threshold; and
   labeling said located energy peak as a false alarm if said located energy peak does not exceed said third threshold.

5. The method according to claim 3, wherein said first threshold and said second threshold are adaptively determined based on said noise floor.

6. The method according to claim 2, wherein said removing operation further comprises:
   locating a lowest value in said multipath search window; and
   subtracting said lowest value from each entry in said profile of energy peaks.

7. The method according to claim 1, further comprising determining if all energy peaks in said profile of energy peaks have been located.

8. An apparatus for identifying valid multipath energy peaks, comprising:
   means for removing a direct current component from each value in a profile of energy peaks;
   means for locating an energy peak in said profile of energy peaks;
   means for categorizing said located energy peak based on a plurality of thresholds; and
   means for processing energy peaks in at least one of said categories of located energy peaks, wherein said means for processing further comprises means for adjusting values of neighbor peaks of said located energy peak, wherein said means for adjusting further comprises means for substituting said noise floor for said neighbor peaks of said located energy peak.

9. The apparatus according to claim 8, further comprising:
   means for calculating a noise floor for a multipath searching window; and
   means for determining a first threshold and a second threshold of said plurality of thresholds.

10. The apparatus according to claim 9, wherein said means for categorizing further comprises:
    means for determining if said located energy peak exceeds said first threshold of said plurality of thresholds;
    means for labeling said located energy peak as a false alarm, if said located energy peak does not exceed said first threshold of said plurality of thresholds;
    means for determining if said located energy peak exceeds said second threshold of said plurality of thresholds; and
    means for labeling said located energy peak as confident, if said located energy peak exceeds said second threshold of said plurality of thresholds.

11. The apparatus according to claim 10, further comprising:
    means for calculating a third threshold; and
    means for labeling said located energy peak as a false alarm if said located energy peak does not exceed said third threshold.

12. The apparatus according to claim 10, wherein said first threshold and said second threshold are adaptively determined based on said noise floor.

13. The apparatus according to claim 9, wherein said means for removing further comprises:
    means for locating a lowest value in said multipath search window; and
    means for subtracting said lowest value from each entry in said profile of energy peaks.

14. The apparatus according to claim 8, further comprising means for determining if all energy peaks in said profile of energy peaks have been located.

15. An apparatus for identifying valid multipath energy peaks, comprising:
- a memory for receiving and storing multipath energy peaks;
- a search arithmetic/logic unit for sorting said multipath energy peaks; and
- a control state machine for controlling said sorting operation, wherein said multipath sorting operation comprises the following acts:
- removing a direct current value component from each value in a profile of energy peaks;
- calculating a noise floor for a multipath searching window;
- determining a confidence threshold and a minimum threshold;
- locating an energy peak in said profile of energy peaks;
- determining if said located energy peak exceeds said minimum threshold;
- marking said located energy peak as a false alarm, if said located energy peak does not exceed said minimum threshold;
- determining if said located energy peak exceeds said confidence threshold;
- marking said located energy peak as confident, if said located energy peak exceeds said confidence threshold; and
- adjusting all values of neighbor peaks of said located energy peak, wherein adjusting further comprises substituting said noise floor for said neighbor peaks of said located energy peak.

16. The apparatus according to claim 15, wherein said multipath sorting operation further comprises the following additional acts:
- calculating a contribution threshold;
- determining whether said located energy peak exceeds said contribution threshold; and
- marking said located energy peak as a false alarm if said located energy peak does not exceed said contribution threshold.

17. The apparatus according to claim 15, further comprising a register file for receiving parameters from a processor.

18. The apparatus according to claim 15, further comprising an interface to rake fingers, wherein said rake fingers are assigned when said located energy peak exceeds said confidence threshold.

19. The apparatus according to claim 15, wherein said apparatus is a mobile terminal.

20. The apparatus according to claim 15, wherein said register file outputs results of said sorting operation to said processor.

* * * * *